(12) United States Patent
Kitabayashi et al.

(10) Patent No.: US 12,368,828 B2
(45) Date of Patent: Jul. 22, 2025

(54) IMAGE EDITING METHOD, IMAGE EDITING SYSTEM, AND STORAGE MEDIUM STORING PROGRAM

(71) Applicant: SEIKO EPSON CORPORATION, Tokyo (JP)

(72) Inventors: Kazuyoshi Kitabayashi, Azumino (JP); Manae Miyata, Kitaazumi-gun Matsukawa-mura (JP); Tetsuta Nishimoto, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 107 days.

(21) Appl. No.: 18/170,331

(22) Filed: Feb. 16, 2023

(65) Prior Publication Data

US 2023/0262204 A1  Aug. 17, 2023

(30) Foreign Application Priority Data

Feb. 17, 2022  (JP) ................. 2022-022674

(51) Int. Cl.
*H04N 9/31* (2006.01)
*G06T 11/60* (2006.01)
(Continued)

(52) U.S. Cl.
CPC ........... *H04N 9/3179* (2013.01); *G06T 11/60* (2013.01); *H04N 23/635* (2023.01); *H04N 23/64* (2023.01); *G06T 2200/24* (2013.01)

(58) Field of Classification Search
CPC .... H04N 9/3179; H04N 23/635; H04N 23/64; H04N 9/3185; H04N 9/3194; H04N 9/3182; G06T 11/60; G06T 2200/24
See application file for complete search history.

(56) References Cited

U.S. PATENT DOCUMENTS

2010/0225746 A1* 9/2010 Shpunt ................. H04N 13/254
                                                         353/70
2019/0108673 A1* 4/2019 Nakamura ........... H04N 9/3185
2019/0108779 A1* 4/2019 Kurita .................... G09G 3/007

FOREIGN PATENT DOCUMENTS

JP          2011188023 A  *  9/2011  ............. H04N 5/225
JP          2017-192040 A     10/2017
(Continued)

OTHER PUBLICATIONS

Projection mapping: I did it with DynaMapper! Easy; Colorful Plus; 2014; https://www.youtube.com/watch?v=fw95JHIBz51.
(Continued)

*Primary Examiner* — Nhan T Tran
(74) *Attorney, Agent, or Firm* — Oliff PLC

(57) ABSTRACT

An information processing apparatus acquires a captured image by causing a camera to image a projection region in a position where a center portion of an imaging range at the time when the projection region including a projection target object in a real space in which a projector and the projection target object are disposed, a first guide image being displayed in the projection region by the projector, and a center portion of the first guide image overlap. The information processing apparatus generates a projection image by causing a user to edit the captured image and transmits projection image data representing the generated projection image to the projector.

8 Claims, 5 Drawing Sheets

(51) Int. Cl.
*H04N 23/60* (2023.01)
*H04N 23/63* (2023.01)

(56) References Cited

FOREIGN PATENT DOCUMENTS

| | | | |
|---|---|---|---|
| JP | 2019-168640 A | 10/2019 | |
| WO | WO-2017208739 A1 * | 12/2017 | ............... G06T 7/60 |

OTHER PUBLICATIONS

Superfast 3d mapping (touchdesigner tutorial); noones img; 2020; https://www.youtube.com/watch?v=chLpe-II-6A.
Fooh, Malcolm; disguise Fundamental Training Day 1—Trimmed; 2020; https://www.youtube.com/watch?v=rwKBu9Re5Ck.
Disguise OmniCal; disguise; 2022; https://www.disguise.one/en/products/omnical/#overview.
CapCut—Video Editor; Bytedance Pte.Ltd; 2021; Digital Application.
InShot—Video Editor; Shantanu Pte.Ltd; 2021; Digital Application.
Canva: Design, Photo & Video; Canva; 2021; Digital Application.
Adobe Premiere Pro—Professional Video Editing Software; Adobe; 2021; https://web.archive.org/web/20211221234544/https://www.adobe.com/products/premiere.html.
Movie; Apple, Inc.; 2021; Digital Application.

* cited by examiner

IMAGE EDITING METHOD, IMAGE EDITING SYSTEM, AND STORAGE MEDIUM STORING PROGRAM

The present application is based on, and claims priority from JP Application Serial Number 2022-022674, filed Feb. 17, 2022, the disclosure of which is hereby incorporated by reference herein in its entirety.

BACKGROUND

1. Technical Field

The present disclosure relates to an image editing method, an image editing system, and a storage medium storing a program.

2. Related Art

In recent years, projection mapping for performing a variety of performances by projecting various images from a projector onto an object having a three-dimensional shape has been spreading. In the following explanation, an object onto which an image is projected from a projector is referred to as projection target object. To perform the projection mapping, it is necessary to create a two-dimensional image to be projected from the projector, that is, a two-dimensional image from the view point of the projector. Various techniques concerning the creation of the two-dimensional image from the view point of the projector have been proposed. Examples of the techniques include a technique disclosed in JP-A-2017-192040 (Patent Literature 1). The technique disclosed in Patent Literature 1 acquires a projection apparatus view point image of a three-dimensional projection target, prepares a three-dimensional model corresponding to the projection target as projection content, and converts the three-dimensional model into a two-dimensional image coinciding with the projection apparatus view point image to thereby create a two-dimensional image to be projected from a projection apparatus.

To perform the projection mapping using the technique disclosed in Patent Literature 1, a user is requested to have expertise such as knowledge concerning a shape of a projection target object seen from the view point of a projector and knowledge concerning a three-dimensional model. However, a user who intends to perform the projection mapping does not always have such expertise. The technique disclosed in Patent Literature 1 has a problem in that a user not having expertise cannot easily recognize the projection mapping.

SUMMARY

According to an aspect of the present disclosure, there is provided an image editing method including: acquiring a captured image by imaging, with a camera, from a position in a real space where a center portion of an imaging range of the camera and a center portion of a first image overlap, a projection region in the real space including a projection target object, which is a projection destination of an image from a projector, the first image being displayed in the projection region by the projector; and transmitting a second image obtained by editing the captured image to the projector.

According to an aspect of the present disclosure, there is provided an image editing system including: a camera; and a processing apparatus configured to control the camera, the processing apparatus executing: acquiring a captured image by imaging, with a camera, from a position in a real space where a center portion of an imaging range of the camera and a center portion of a first image overlap, a projection region in the real space including a projection target object, which is a projection destination of an image from a projector, the first image being displayed in the projection region by the projector; and transmitting a second image obtained by editing the captured image to the projector.

According to an aspect of the present disclosure, there is provided a non-transitory computer-readable storage medium storing a program for causing a computer to execute: acquiring a captured image by imaging, with a camera, from a position in a real space where a center portion of an imaging range of the camera and a center portion of a first image overlap, a projection region in the real space including a projection target object, which is a projection destination of an image from a projector, the first image being displayed in the projection region by the projector; and transmitting a second image obtained by editing the captured image to the projector.

DESCRIPTION OF EXEMPLARY EMBODIMENTS

Technically preferable various limitations are added to an embodiment explained below. However, embodiments of the present disclosure are not limited to the embodiment explained below.

1. Embodiment

Figure 1:
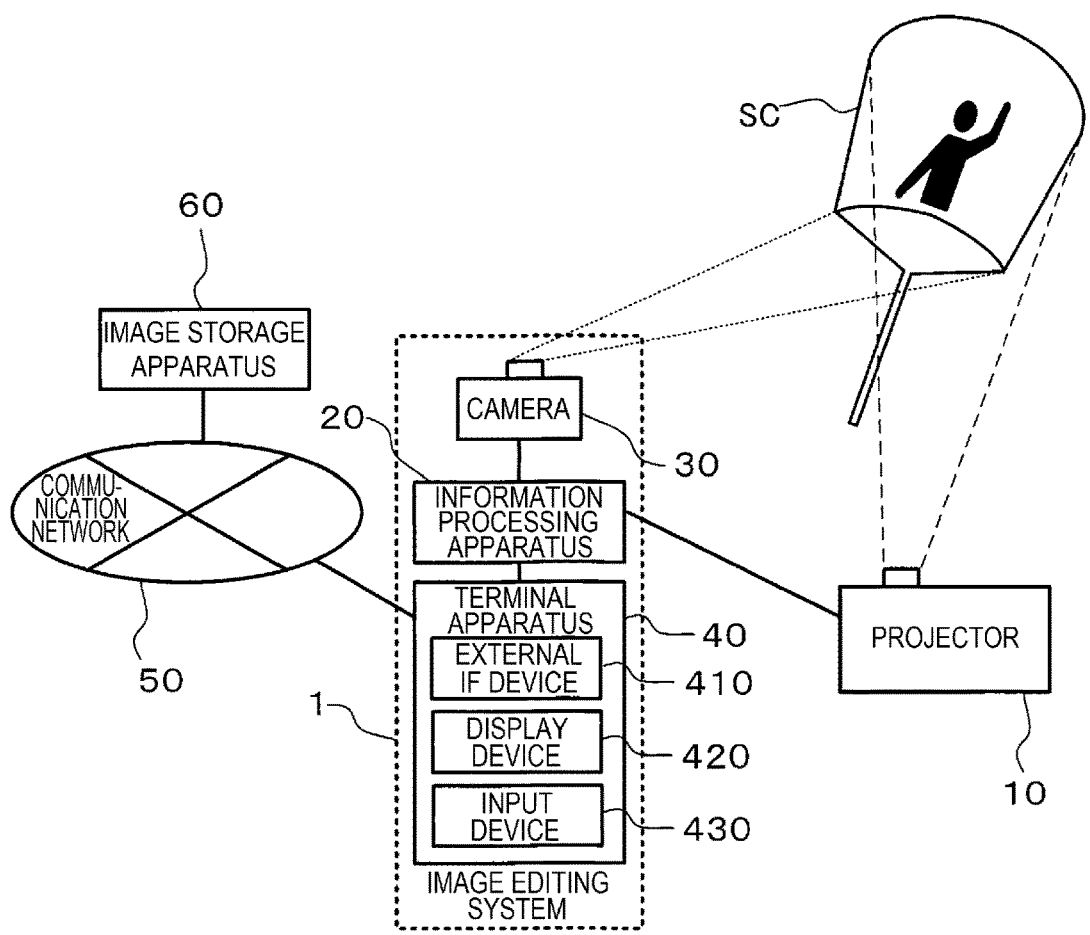
FIG. 1 is a diagram showing a configuration example of an image editing system according to an embodiment of the present disclosure.

FIG. 1 is a diagram showing a configuration example of an image editing system 1 according to an embodiment of the present disclosure. The image editing system 1 is an information processing system for editing image data representing an image projected from a projector 10 onto a projection region including a projection target object SC. The projection target object SC in this embodiment is a fan, on paper of which a person is drawn. The projector 10 and the projection target object SC are set in a room of a user who uses the projector 10. The room of the user who uses the projector 10 is an example of the real space in the present disclosure.

The projector 10 is an apparatus that projects image light corresponding to image data supplied from an image supply apparatus to thereby project an image represented by the image data. As explained in detail below, the image supply apparatus in this embodiment is an information processing apparatus 20. Although detailed illustration is omitted in FIG. 1, the projector 10 includes a projection lens, a liquid crystal driver, a liquid crystal panel, and a light source unit. The liquid crystal driver drives the liquid crystal panel according to image data supplied from the image supply apparatus to thereby draw an image represented by the image data on the liquid crystal panel. The light source unit includes a light source such as a halogen lamp or a laser diode. Light from the light source is modulated for each of pixels in the liquid crystal panel and projected as image light via the projection lens.

The projection region in this embodiment is a predetermined region of the projector 10 in the room. An image is projected from the projector 10 onto the projection region, whereby the image is displayed in the projection region. In the following explanation, the image projected by the projector 10 is referred to as projection image. Image data representing the projection image is sometimes referred to as projection image data. The projection target object SC is included in the projection region. In this embodiment, projection mapping for decorating the projection target object SC is realized by displaying the projection image in the projection region. The projection image may be a still image or may be a moving image. The projection image in this embodiment is a still image.

As shown in FIG. 1, the image editing system 1 includes the information processing apparatus 20, a camera 30, and a terminal apparatus 40. In FIG. 1, the projector 10, the projection target object SC, a communication network 50, and an image storage apparatus 60 are illustrated besides the image editing system 1.

The information processing apparatus 20 is, for example, a stick-type personal computer. The information processing apparatus 20 includes a male connector conforming to a predetermined standard such as the USB (Universal Serial Bus). The projector 10 includes a female connector corresponding to the male connector. The male connector of the information processing apparatus 20 is inserted into the female connector of the projector 10, whereby the information processing apparatus 20 and the projector 10 are electrically connected. The information processing apparatus 20 communicates with the camera 30 and the terminal apparatus 40 by radio or wire.

The camera 30 is an apparatus for imaging the projection region. The camera 30 is set in the room of the user using, for example, a tripod in a posture in which the optical axis of the camera 30 is directed to the projection target object SC. In this embodiment, the user can optionally change a position where the camera 30 is set in the room. The camera 30 performs imaging under control by the information processing apparatus 20 and outputs image data representing a captured image to the information processing apparatus 20. In the following explanation, the image data representing the captured image is referred to as captured image data.

The communication network 50 is an electric communication line such as the Internet. The image storage apparatus 60 is connected to the communication network 50. The image storage apparatus 60 is, for example, a data server.

One or a plurality of material data are stored in the image storage apparatus 60. Specific examples of the image data stored in the image storage apparatus 60 include projection image data edited by the image editing system 1 and captured image data representing a captured image captured by the camera 30. Since the image data are stored in the image storage apparatus 60, the user of the projector 10 can reuse an edited projection image or a captured image of the projection region.

The terminal apparatus 40 is a smartphone used by the user of the projector 10. As shown in FIG. 1, the terminal apparatus 40 includes an external IF device 410, a display device 420, and an input device 430. The external IF device 410 includes a communication circuit that communicates with the image storage apparatus 60 via the communication network 50 and communicates with the information processing apparatus 20. IF is an abbreviation of Interface. The display device 420 includes a liquid crystal display and a driving circuit for the liquid crystal display. The terminal apparatus 40 displays various images on the display device 420 under the control by the information processing apparatus 20. The input device 430 is a transparent sheet-like pressure sensitive sensor provided to cover a surface region of the display device 420 and receives input operation of the user. The terminal apparatus 40 transmits, via the external IF device 410, to the information processing apparatus 20, input operation data indicating input operation of the user to the input device 430. Consequently, the input operation of the user is transmitted to the information processing apparatus 20. An image drawing tool, which is software for generating a projection image by editing a captured image captured by the camera 30, is installed in advance in the terminal apparatus 40. The image drawing tool corresponds to the editing function in the present disclosure.

As explained in detail below, the information processing apparatus 20 performs, according to the input operation to the terminal apparatus 40, imaging of the projection region by the camera 30, editing of projection image data corresponding to input operation of the user performed on the input device 430, and output of the edited projection image data to the projector 10. The projector 10 projects, onto the projection region, a projection image represented by the projection image data output from the information processing apparatus 20.

Figure 2:
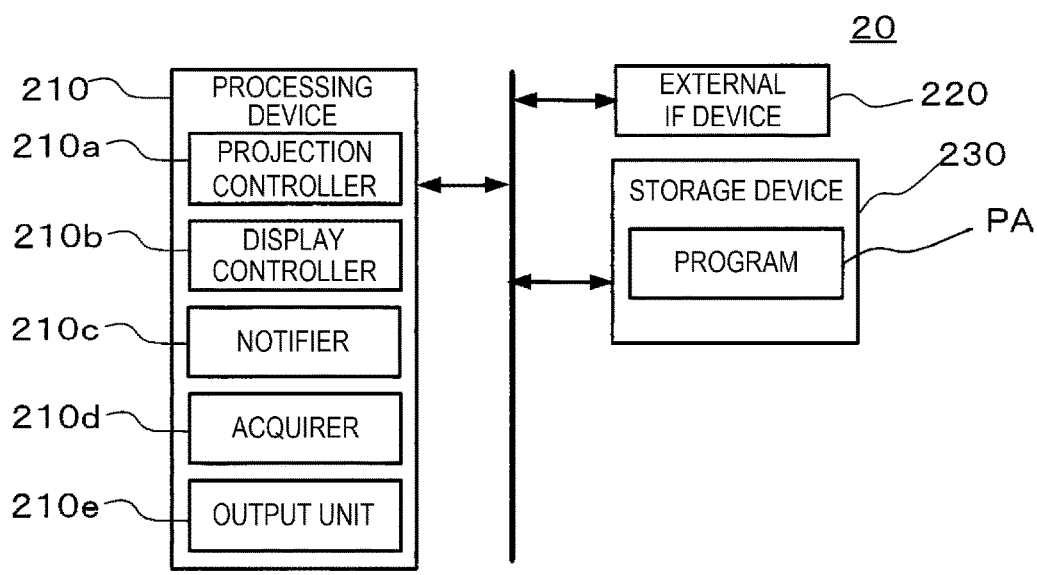
FIG. 2 is a diagram showing a configuration example of an information processing apparatus.

FIG. 2 is a diagram showing a configuration example of the information processing apparatus 20. As shown in FIG. 2, the information processing apparatus 20 includes a processing device 210, an external IF device 220, and a storage device 230. The processing device 210 includes a processor such as a CPU (Central Processing Unit), that is, a computer. The processing device 210 may be configured by a single processor or may be configured by a plurality of processors. The processing device 210 operates according to a program PA stored in the storage device 230 to thereby function as a control center of the information processing apparatus 20.

The external IF device 220 includes the male connector explained above. In a state in which the male connector is inserted into the female connector of the projector 10 and the information processing apparatus 20 and the projector 10 are electrically connected, the external IF device 220 outputs, to the projector 10, data or a signal given from the processing device 210. The external IF device 220 includes a communication circuit that communicates with the camera 30 or the terminal apparatus 40.

The storage device 230 is a storage medium readable by the processing device 210. The storage device 230 includes, for example, a nonvolatile memory and a volatile memory.

The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

The program PA for causing the processing device 210 to execute the image editing method of the present disclose is stored in advance in the nonvolatile memory of the storage device 230. The volatile memory of the storage device 230 is used by the processing device 210 as a work area in executing the program PA.

When detecting the connection of the information processing apparatus 20 to the projector 10, the processing device 210 reads out the program PA from the nonvolatile memory to the volatile memory and starts execution of the read-out program PA. When detecting connection of the terminal apparatus 40 and the camera 30, the processing device 210 operating according to the program PA functions as a projection controller 210*a*, a display controller 210*b*, a notifier 210*c*, an acquirer 210*d*, and an output unit 210*e* shown in FIG. 2. The projection controller 210*a*, the display controller 210*b*, the notifier 210*c*, the acquirer 210*d*, and the output unit 210*e* shown in FIG. 2 are software modules realized by causing the processing device 210 to operate according to the program PA. Functions respectively performed by the projection controller 210*a*, the display controller 210*b*, the notifier 210*c*, the acquirer 210*d*, and the output unit 210*e* shown in FIG. 2 are as explained below.

Figure 3:
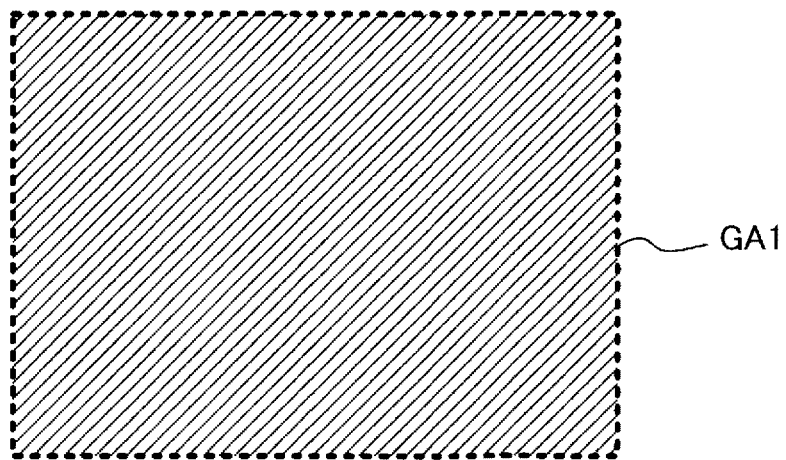
FIG. 3 is a diagram showing an example of a first guide image.
Figure 4:
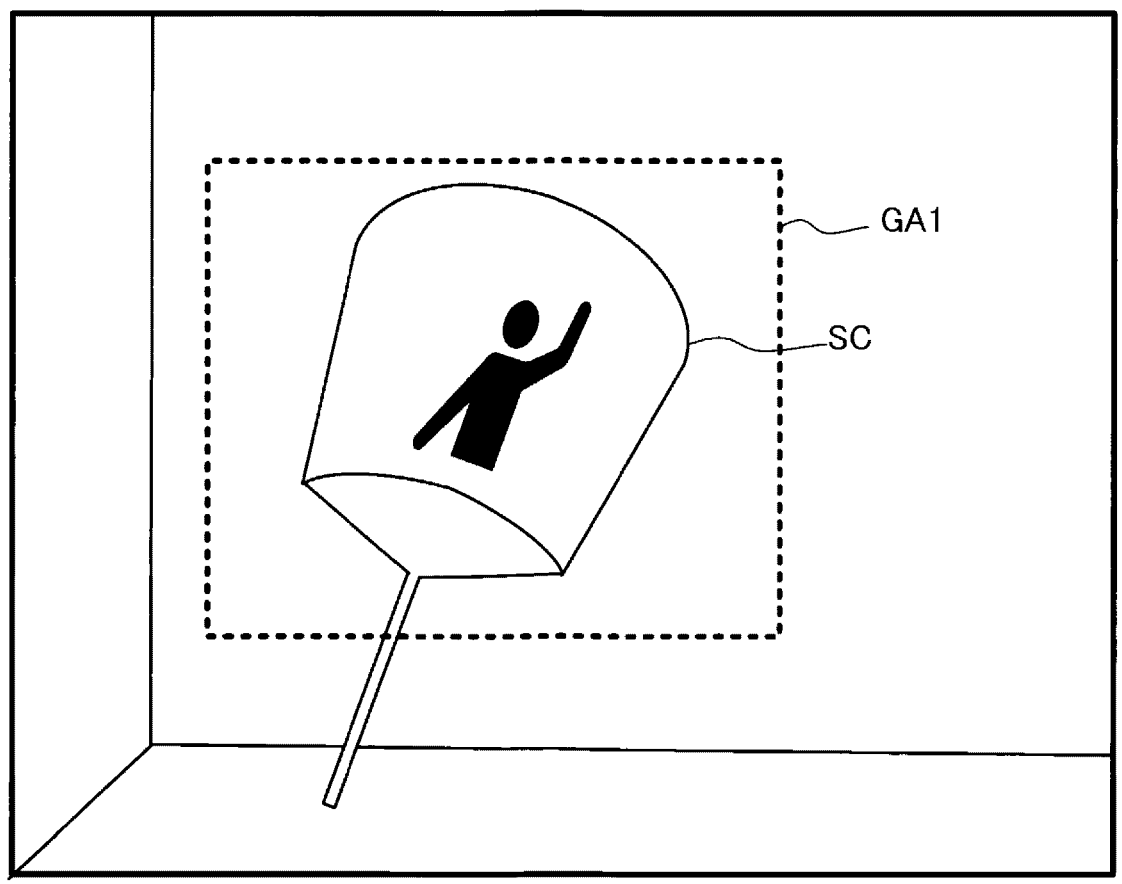
FIG. 4 is a diagram showing a setting example of a projection target object with respect to a projection region.

The projection controller 210*a* outputs, to the projector 10, a first signal for instructing the projector 10 to project an image indicating a projection range of the projector 10. The projection range of the projector 10 is decided according to a direction of the optical axis of the projector 10 and an angle of view of the projector 10. In the following explanation, the image indicating the projection range of the projector 10 is referred to as first guide image GA1 Specific examples of the first guide image GA1 include a rectangular image uniformly painted out in a first color such as white and the rectangular image bordered with a second color different from the first color. The second color in this embodiment is red. However, the second color is not limited to red. FIG. 3 is a diagram showing an example of the first guide image GA1 In FIG. 3, hatching represents the first color and a dotted line represents a line drawn in the second color. That is, the first guide image GA1 in this embodiment is a rectangular image uniformly painted out in the first color and bordered with the second color. A region surrounded by the dotted line is the projection range. The first guide image GA1 is an example of the first image in the present disclosure. The projector 10 that has received the first signal projects the first guide image GA1 onto the projection region. The user who has visually recognized the first guide image GA1 displayed in the projection region sets the projection target object SC in the projection range indicated by the first guide image GA1 as shown in FIG. 4. In FIG. 4, drawing of the hatching indicating the first color is omitted. That is, the projection target object SC is included and the first guide image GA1 is displayed in the projection region.

The display controller 210*b* output a second signal for instruction an imaging start to the camera 30. When receiving the second signal, the camera 30 performs imaging at a predetermined period such as a several milliseconds interval and outputs captured image data to the information processing apparatus 20. As explained above, the camera 30 is set in the room of the user in a posture in which the optical axis of the camera 30 is directed to the projection target object SC. Accordingly, projection region where the first guide image GA1 is displayed and the projection target object SC set in the projection region are reflected in a captured image GA2 captured by the camera 30.

Figure 5:
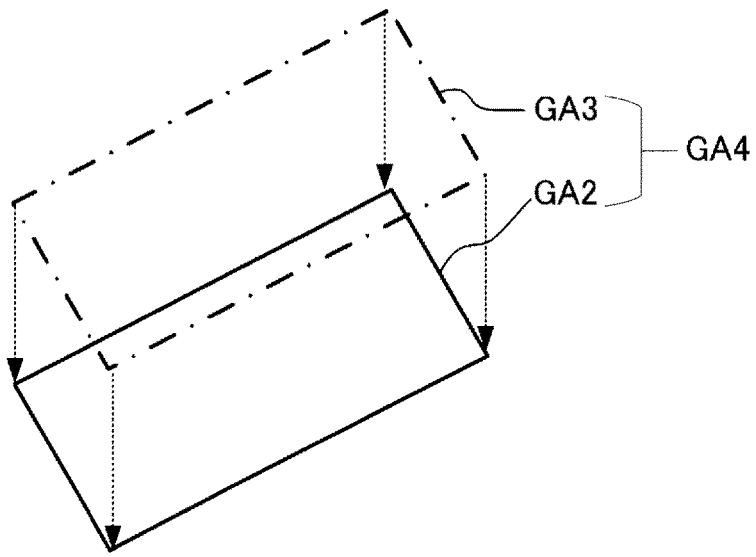
FIG. 5 is a diagram showing a relation among a captured image, a second guide image, and a superimposed image.

Every time captured image data is input from the camera 30, the display controller 210*b* generates a superimposed image GA4 shown in FIG. 5 based on the captured image data. FIG. 5 is a diagram showing a relation among the superimposed image GA4, the captured image GA2 represented by the captured image data, and a second guide image GA3. The second guide image GA3 is an image indicating an imaging range of the camera 30. The imaging range of the camera 30 is decided according to a direction of the optical axis of the camera 30 and an angle of view of the camera 30. The second guide image GA3 in this embodiment is an image of a rectangular frame line partitioning the outer edge of the captured image GA2. In this embodiment, the frame line is colored in a third color different from the first color and different from the second color. In FIG. 5, the coloring by the third color is represented by an alternate long and short dash line. The third color in this embodiment is blue. However, the third color is not limited to blue. As shown in FIG. 5, the superimposed image GA4 is an image obtained by superimposing the second guide image GA3 on the captured image GA2.

Figure 6:
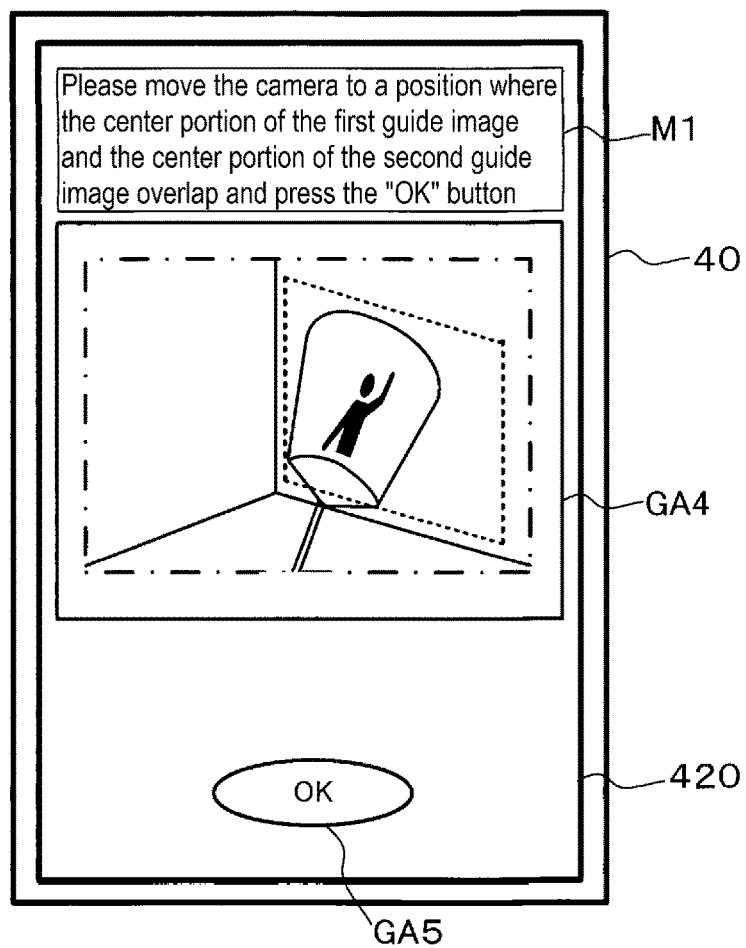
FIG. 6 is a diagram showing a display example of the superimposed image, a message, and a user interface image.

As shown in FIG. 6, the display controller 210*b* displays the superimposed image GA4 on the display device 420. The display controller 210*b* displays, on the display device 420, a user interface image GA5 for requesting the user to perform input for determining a position of the camera 30. As shown in FIG. 6, the user interface image GA5 in the present disclosure is an image of a virtual operation piece.

The notifier 210*c* performs notification for requesting the user to move the camera 30 to a position where a center portion of the first guide image GA1 and a center portion of the second guide image GA3 overlap. The center portion of the first guide image GA1 means a region on the inner side of a first circle having a predetermined radius and centering on a center position of the first guide image GA1 in the first guide image GA1 The center portion of the second guide image GA3 means a region on the inner side of a second circle having the predetermined radius and centering on a center position of the second guide image GA3 in the second guide image GA3. The center position of the first guide image GA1 means an intersection of two diagonal lines in the first guide image GA1 Similarly, the center position of the second guide image GA3 means an intersection of two diagonal lines in the second guide image GA3. The radius of the circles defining the center portions of the first guide image GA1 and the second guide image GA3 may be set to a preferred value by an experiment or the like. The center portion of the first guide image GA1 and the center portion of the second guide image GA3 overlapping means that the distance between the center of the first circle and the center of the second circle is smaller than the radius explained above.

As explained above, the first guide image GA1 corresponds to the radiation range of the projector 10 and the second guide image GA3 corresponds to the imaging range of the camera 30. Therefore, the center portion of the first guide image GA1 and the center portion of the second guide image GA3 overlapping is equivalent to a center portion of the projection range of the projector 10 and a center portion of the imaging range of the camera 30 overlapping.

In this embodiment, as shown in FIG. 6, the notifier 210*c* displays, on the display device 420, a message M1 of words for requesting the user to move the camera 30 to the position where the center portion of the first guide image GA1 and the center portion of the second guide image GA3 overlap. In this embodiment, the displaying the message M1 on the display device 420 is equivalent to the performing the notification for requesting the user to move the camera 30 to the position where the center portion of the first guide image GA1 and the center portion of the second guide image GA3 overlap. The notifier 210c may perform the notification by outputting reading voice of the message M1. The user who has visually recognized the message M1 carries the camera 30 and moves while checking an overlapping state of the center portion of the first guide image GA1 and the center portion of the second guide image GA3 through the superimposed image GA4 displayed on the display device 420. According to the movement of the camera 30, the overlapping state of the center portion of the first guide image GA1 and the center portion of the second guide image GA3 in the superimposed image GA4 displayed on the display device 420 changes.

Figure 7:
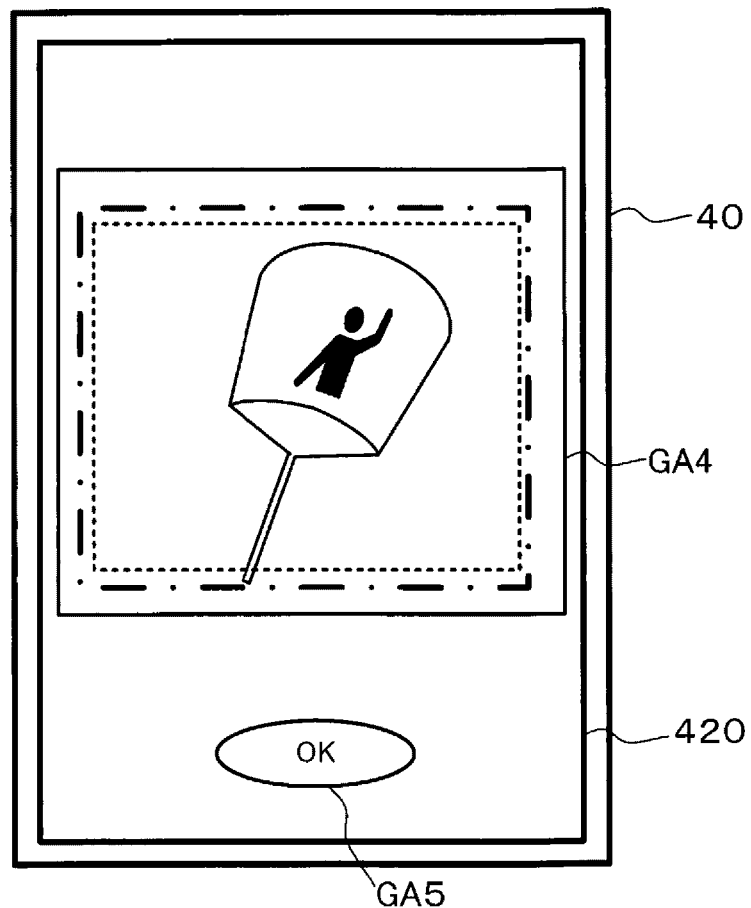
FIG. 7 is a diagram showing an example of the superimposed image at the time when a center portion of the first guide image and a center portion of the second guide image substantially coincide.

The acquirer 210d determines, based on the superimposed image GA4, whether the size of an overlapping region where the center portion of the first guide image GA1 and the center portion of the second guide image GA3 overlap is equal to or larger than a threshold. The threshold may be decided according to the area of the first circle or the second circle. Specific examples of the threshold in the aspect include a value of 60% to 90% of the area of the first circle or the second circle. When the size of the overlapping region is smaller than the threshold, the acquirer 210d causes the notifier 210c to continue displaying the message M1. When the size of the overlapping region is equal to or larger than the threshold, the acquirer 210d causes the notifier 210c to end displaying the message M1. FIG. 7 is a diagram showing a display example of the superimposed image GA4 and the user interface image GA5 in the case in which the size of the overlapping region is equal to or larger than the threshold. Since the size of the overlapping region is equal to or larger than the threshold, the message M1 is not displayed in the example shown in FIG. 7. As shown in FIG. 7, when the message M1 is not displayed on the display device 420 any longer, the user touches the user interface image GA5.

When detecting the touch on the user interface image GA5, first, the acquirer 210d outputs, to the projector 10, a third signal for instructing the projector 10 to stop projecting the first guide image GA1 Subsequently, the acquirer 210d writes captured image data output from the camera 30 in the volatile memory of the storage device 230 as reference image data representing a reference image serving as a reference in editing a projection image. The reference image data is image data representing the captured image GA2 in the projection region where the first guide image GA1 is not displayed.

The output unit 210e acquires projection image data representing a projection image by causing the user to edit the reference image. In this embodiment, first, the output unit 210e transmits the reference image data to the terminal apparatus 40 and causes the terminal apparatus 40 to start an image drawing tool. The terminal apparatus 40 executing the image drawing tool displays the image represented by the reference image data on the display device 420. The user edits, using the image drawing tool, a projection image for decorating the projection target object SC while referring to the position and the shape of the projection target object SC reflected in the reference image.

Figure 8:
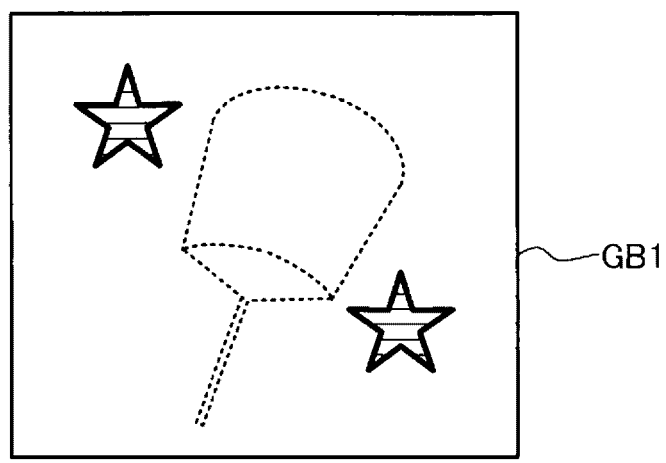
FIG. 8 is a diagram showing an example of a projection image edited based on a reference image.
Figure 9:
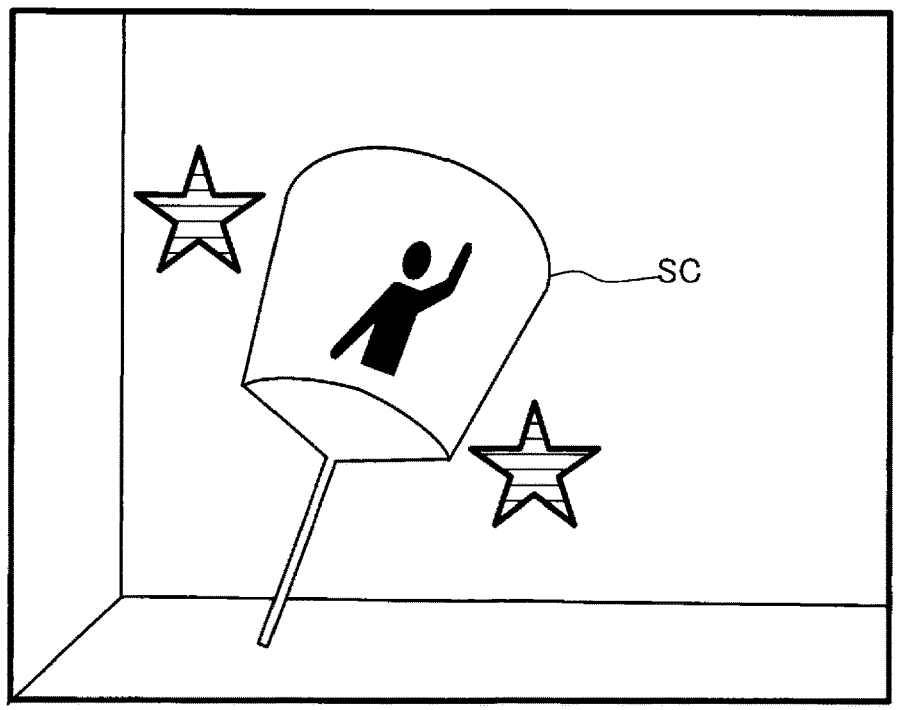
FIG. 9 is a diagram showing a projection example of a projection image by a projector.

FIG. 8 is a diagram showing an example of the projection image edited based on the reference image. In FIG. 8, the projection target object SC reflected in the reference image is represented by a dotted line. Images of stars added with horizontal-line hatching are projection images drawn by the user in order to decorate the projection target object SC. The horizontal-line hatching in FIG. 8 represents a color added to the images of the stars such as yellow. The output unit 210e acquires image data representing the projection image edited based on the reference image from the terminal apparatus 40 as the projection target image. The projection image edited based on the reference image is an example of the second image in the present disclosure. The output unit 210e outputs the projection image data to the projector 10. The projector 10 projects the projection image represented by the projection image data output from the information processing apparatus 20 onto the projection region. As a result, as shown in FIG. 9, the images of the stars for decorating the projection target object SC are displayed around the projection target object SC. Horizontal-line hatching in FIG. 9 represents a color added to the images of the stars such as yellow.

The position of the camera 30 at the time when the reference image is captured is the position where the center portion of the first guide image GA1 and the center portion of the second guide image GA3 overlap. The center portion of the first guide image GA1 and the center portion of the second guide image GA3 overlapping means that the center portion of the projection range of the projector 10 and the center portion of the imaging range of the camera 30 overlap. The center portion of the projection range of the projector 10 and the center portion of the imaging range of the camera 30 overlapping means that a direction of the optical axis of the projector 10 and a direction of the optical axis of the camera 30 substantially coincide and an angle of view of the projector 10 and an angle of view of the camera 30 substantially coincide. Therefore, a position and a shape of the projection target object SC in the reference image substantially coincide with a position and a shape of the projection target object SC at the time when the projection target object SC is viewed from the projector 10. Accordingly, the user can create a projection image matching the position and the shape of the projection target object SC by drawing a projection image for decorating the projection target object SC while referring to the position and the shape of the projection target object SC reflected in the reference image.

Figure 10:
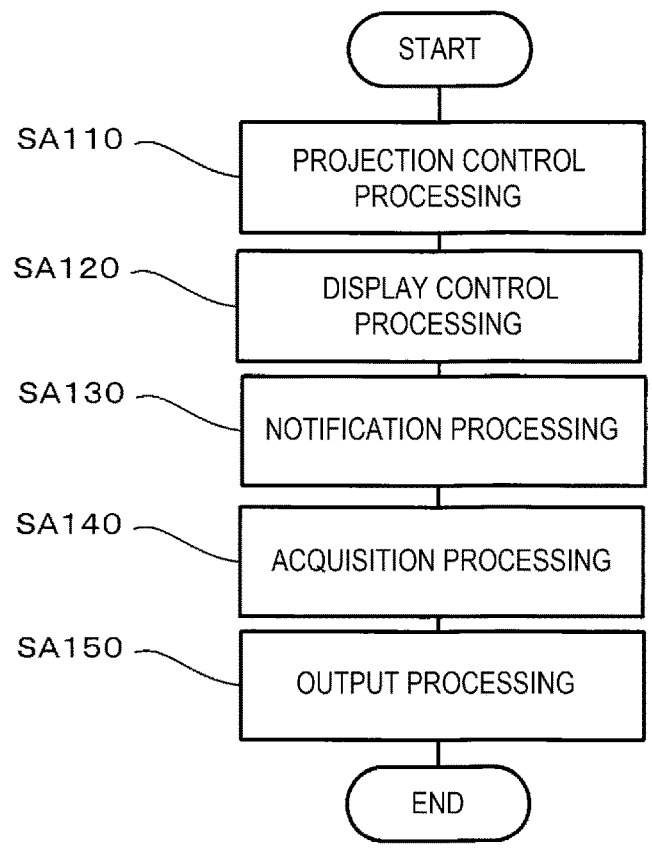
FIG. 10 is a flowchart showing a flow of an image editing method executed by a processing device according to a program.

The processing device 210 operating according to the program PA executes an image editing method shown in FIG. 10. As shown in FIG. 10, the image editing method in this embodiment includes projection control processing SA110, display control processing SA120, notification processing SA130, acquisition processing SA140, and output processing SA150.

In the projection control processing SA110, the processing device 210 functions as the projection controller 210a. In the projection control processing SA110, the processing device 210 causes the projector 10 to display the first guide image GA1 by outputting, to the projector 10, a first signal for instructing the projector 10 to project the first guide image GA1.

In the display control processing SA120, the processing device 210 functions as the display controller 210b. In the display control processing SA120, the processing device 210 outputs a second signal for instructing imaging to the camera 30. Subsequently, the processing device 210 displays, on the display device 420, the superimposed image GA4 obtained by superimposing the second guide image GA3 on the captured image GA2 captured by the camera 30 and the user interface image GA5.

In the notification processing SA130, the processing device 210 functions as the notifier 210c. In the notification processing SA130, the processing device 210 displays the message M1 on the display device 420 to thereby perform notification for requesting the user to move the camera 30 to the position where the center portion of the first guide image GA1 and the center portion of the second guide image GA3 overlap.

In the acquisition processing SA140, the processing device 210 functions as the acquirer 210d. In the acquisition processing SA140, the processing device 210 determines whether the size of the overlapping region is equal to or larger than the threshold. When the size of the overlapping region is smaller than the threshold, the acquirer 210d causes the notifier 210c to continue displaying the message M1. When the size of the overlapping region is equal to or larger than the threshold, the acquirer 210d causes the notifier 210c to end displaying the message M1. At the opportunity when the message M1 is not displayed on the display device 420 any longer, the user touches the user interface image GA5. When detecting the touch on the user interface image GA5, the processing device 210 outputs, to the projector 10, a third signal for instructing the projector 10 to stop projecting the first guide image GA1 and writes, in the volatile memory of the storage device 230, captured image data representing the captured image GA2 of the projection region where the first guide image GA1 is not displayed, that is, reference image data representing a reference image.

In the output processing SA150, the processing device 210 functions as the output unit 210e. In the output processing SA150, the processing device 210 acquires projection image data representing a projection image by causing the user to perform editing for the reference image represented by the reference image data. Subsequently, the processing device 210 outputs the projection image data to the projector 10.

As explained above, in this embodiment, what the user of the projector 10 is requested is to determine a position of the camera 30 according to the message M1 and touches the position and to edit a projection image referring to the captured image GA2 of the camera 30. In the technique disclosed in Patent Literature 1, it is necessary to prepare a three-dimensional model corresponding to the projection target object SC and to coordinate-convert the three-dimensional model into a two-dimensional image coinciding with a projection apparatus view point image. Expertise concerning the three-dimensional model and expertise concerning the coordinate conversion are required. In contrast, in this embodiment, it is unnecessary to prepare a three-dimensional model corresponding to the projection target object SC and it is unnecessary to perform coordinate conversion when editing a projection image. Therefore, according to this embodiment, a user not having expertise concerning a three-model and the like is capable of easily performing the projection mapping.

2. Modifications

The embodiment explained above can be modified as explained below.

(1) In the embodiment explained above, an application example of the present disclosure to the projection mapping for realizing decoration in the room of the user of the projector 10 is explained. However, the present disclosure may be applied to projection mapping for realizing commodity display in a store such as a retail store and may be applied to projection mapping for realizing performances in a theme park, an event venue, or the like.

(2) In the embodiment explained above, one projector 10 projects the projection image onto one projection target object SC. However, a plurality of projectors 10 respectively disposed in different positions may project projection images onto one projection target object SC. Since the projection images are projected onto the one projection target object SC from the plurality of projectors 10 respectively disposed in the different positions, projection mapping with increased brightness can be realized. Since the projection images are projected onto the one projection target object SC from the plurality of projectors 10 respectively disposed in the different positions, projection mapping that reduces shadow as much as possible and can be seen from anywhere in 360° can be realized.

(3) When the user interface image GA5 is touched, the acquirer 210d in the embodiment explained above outputs the third signal for stopping displaying the first guide image GA1 and, thereafter, acquires the reference image data. However, the output of the third signal may be omitted. In an aspect in which the output of the third image is omitted, the first guide image GA1 is included in the captured image GA2 represented by the captured image data output from the camera 30. The acquirer 210d may directly write the captured image data representing the captured image GA2 including the first guide image GA1 in the volatile memory of the storage device 230 as the reference image data. The first guide image GA1 is included in the reference image in this aspect. In the aspect in which the output of the third image is omitted, the acquirer 210d may generate the reference image data by applying image processing for erasing or diluting the first guide image GA1 to the captured image data. Specific examples of the image processing for erasing or diluting the first guide image GA1 include image processing for replacing a pixel value of a pixel corresponding to the first guide image GA1 with a pixel value of a peripheral pixel, which is a pixel located around the pixel and not corresponding to the first guide image GA1. Other specific examples of the image processing for erasing or diluting the first guide image GA1 include image processing for replacing a pixel value of a pixel corresponding to the first guide image GA1 with an average value of the pixel value of the pixel and a pixel value of each of a plurality of peripheral pixels. According to this aspect, a period from when input operation for instructing imaging until when the imaging is actually performed is reduced.

(4) The acquirer 210d in the embodiment explained above causes the notifier 210c to continue the notification for requesting the user to move the camera 30 when determining that the size of the overlapping region is smaller than the threshold and ends the notification by the notifier 210c when determining that the size of the overlapping region is equal to or larger than the threshold. However, the acquirer 210d may cause the notifier 210c to perform notification for requesting the user to perform input for instructing determination of a position of the camera 30 when determining that the size of the overlapping region is equal to or larger than the threshold. The acquirer 210d may store the reference image data without waiting for input operation of the user when determining that the size of the overlapping region is equal to or larger than the threshold. According to the latter aspect, it is possible to automatically store the reference image data when the size of the overlapping region is equal to or larger than the threshold. Labor of the user is reduced. In the latter aspect, it is unnecessary to display the user interface image GA5. The determination about whether the size of the overlapping region is smaller than the threshold is not essential and may be omitted.

(5) The second guide image GA3 in the embodiment explained above is the image indicating the imaging range of the camera 30. However, in order to clearly indicate the center portion of the imaging range of the camera 30, the display controller 210b may display a third guide image indicating the center portion of the imaging range of the camera 30 on the display device 420 instead of or together with the second guide image GA3. In this aspect, a position in the real space where the center portion of the imaging range and the center portion of the first guide image GA1 overlap means a position where a center portion of the third guide image in the superimposed image GA4 or the third guide image itself and the center portion of the first guide image GA1 overlap.

The third guide image may be an image smaller than the second guide image GA3. Specific examples of the third guide image smaller than the second guide image GA3 include the image of the second circle explained above, an image of a polygon inscribing or circumscribing the second circle, and an image of a plurality of line segments crossing in the center of the second circle. By displaying the third guide image smaller than the second guide image GA3 together with the second guide image GA3, it is possible to clearly indicate the entire imaging range of the camera 30 and the center portion of the imaging range to the user. When the third guide image smaller than the second guide image GA3 is displayed instead of the second guide image GA3, it is possible to clearly indicate the center portion of the imaging range of the camera 30 to the user.

The third guide image may be an image having the same size as the second guide image GA3. Specific examples of the third guide image having the same size as the third guide image GA3 include an image including a rectangular frame line partitioning the outer edge of the captured image GA2 and diagonal lines of the frame line and an image of the diagonal lines. The third guide image is an example of the third image in the present disclosure. In the former aspect, by displaying the third guide image instead of the second guide image GA3, it is possible to clearly indicate the entire imaging range of the camera 30 and the center portion of the imaging range to the user. In the latter aspect, when the third guide image is displayed together with the second guide image GA3, it is possible to clearly indicate the entire imaging range of the camera 30 and the center portion of the imaging range to the user. When the third guide image is displayed instead of the second guide image GA3, it is possible to clearly indicate the center portion of the imaging range of the camera 30 to the user.

In order to clearly indicate the center portion of the first guide image GA1, an image indicating the center portion of first guide image GA1 may be included in the first guide image GA1 Specific examples of the image indicating the center portion of the first guide image GA1 include the image of the first circle explained above, an image of a polygon inscribing or circumscribing the first circle, and an image of a plurality of line segments crossing in the center of the first circle.

(6) In the embodiment explained above, the output unit 210e transmits the reference image data to the terminal apparatus 40 and starts the image drawing tool at the opportunity when the reference image data is stored in the volatile memory. However, at the opportunity when the reference image data is stored in the volatile memory, the output unit 210e may display, on the display device 420, a user interface image such as a virtual operation piece for causing the user to input a start of the image drawing tool. In this aspect, the output unit 210e causes the terminal apparatus 40 to start the image drawing tool according to input operation to the user interface image.

(7) The notification processing SA130 in the embodiment explained above may be omitted. In an aspect in which the notification processing SA130 is omitted, the notifier 210c may be omitted. This is because a projection image can be still easily created even if the notification processing SA130 is omitted. When the projector 10 projects the first guide image GA1 at the opportunity when the projector 10 is turned on, the projection controller 210a and the projection control processing SA110 can be omitted. It is possible to grasp the imaging range of the camera 30 from the captured image GA2 and it is also possible to grasp the center portion of the imaging range. Therefore, the superimposition of the second guide image GA3 may be omitted.

(8) In the embodiment explained above, the camera 30 and the terminal apparatus 40 are the separate apparatuses. However, the camera 30 may be included in the terminal apparatus 40. For example, when the terminal apparatus 40 is a smartphone including a camera, the camera of the smartphone only has to play a role of the camera 30. In the embodiment, the information processing apparatus 20 is an apparatus different from all of the terminal apparatus 40, the camera 30, and the projector 10. However, the information processing apparatus 20 may be included in any of the terminal apparatus 40, the camera 30, and the projector 10.

(9) The projection controller 210a, the display controller 210b, the notifier 210c, the acquirer 210d, and the output unit 210e in the embodiment explained above are the software modules. However, any one of, a plurality of, or all of the projection controller 210a, the display controller 210b, the notifier 210c, the acquirer 210d, and the output unit 210e may be hardware modules such as an ASIC (Application Specific Integrated Circuit). Even if any one of, a plurality of, or all of the projection controller 210a, the display controller 210b, the notifier 210c, the acquirer 210d, and the output unit 210e are hardware modules, the same effects as the effects in the embodiment are achieved.

(10) The program PA may be manufactured alone or may be provided with or without charge. Examples of a specific aspect in providing the program PA include an aspect of writing the program PA in a computer-readable storage medium such as a flash ROM and providing the program PA and an aspect of providing the program PA by downloading the program PA through an electric communication line such as the Internet. By causing a general computer to operate according to the program PA provided by these aspects, it is possible to cause the computer to execute the image editing method according to the present disclosure.

3. An Aspect Grasped from at Least One of the Embodiment and the Modifications The present disclosure is not limited to the embodiment and the modifications explained above and can be realized in various aspects in a range not departing from the gist of the present disclosure. For example, the present disclosure can also be realized by the following aspects. Technical features in the embodiment corresponding to technical features in the aspects described below can be substituted or combined as appropriate in order to solve a part of all of the problems of the present disclosure or achieve a part or all of the effects of the present disclosure. Unless the technical features are explained as essential technical features in this specification, the technical features can be deleted as appropriate.

An image editing method according to an aspect of the present disclosure includes acquisition processing and output processing. A captured image captured by a camera in a projection region including a projection target object, which is a projection destination of an image from a projector, a first guide image being displayed in the projection region by the projector, is acquired. The projection region is a region in a real space where the projector and the projection target object are disposed. A position of the camera that captures the captured image is a position in the real space where a center portion of an imaging range of the camera and a center portion of the first guide image overlap. In the output processing, a projection image is obtained by editing the captured image acquired in the acquisition processing. The projection image is transmitted to the projector. With the image editing method in this aspect, even a user not having expertise is capable of easily performing projection mapping.

An image editing method according to a more preferable aspect may further include displaying, on a display apparatus, a superimposed image obtained by superimposing an image obtained by imaging, with the camera, the projection region where the first guide image is projected and a third guide image indicating the center portion of the imaging range. The third guide image is an example of the third image in the present disclosure. The position of the camera in the real space is a position where the center portion of the first guide image and a center portion of the third guide image or the third guide image itself overlap in the superimposed image. According to this aspect, a user can determine the position of the camera while grasping a degree of the overlap of the center portion of the imaging range of the camera and the center portion of the projection range of the projector from the first guide image and the second guide image in the superimposed image.

An image editing method in a still more preferable aspect may further include, when the captured image is acquired, displaying a user interface image used to invoke an editing function for editing the captured image. The second image in this aspect may be obtained by editing the captured image with the editing function. According to this aspect, the user can invoke, with operation on the user interface image, the editing function for editing the captured image.

An image editing method according to a still more preferable aspect may include outputting a notification for requesting a user to move the camera to the position in the real space where the center portion of the imaging range and the center portion of the first guide image overlap. According to this aspect, it is possible to request the user to move the camera to the position in the real space where the center portion of the imaging range of the camera and the center portion of the first guide image overlap.

An image editing method according to a still more preferable aspect may include: determining whether a size of an overlapping region is equal to or larger than a threshold; and outputting the notification when the size of the overlapping region is smaller than the threshold. The overlapping region means a region where the center portion of the imaging range of the camera and the center portion of the first guide image overlap in the superimposed image. According to this aspect, when the size of the overlapping region is smaller than the threshold, it is possible to request the user to move the camera to the position in the real space where the center portion of the imaging range of the camera and the center portion of the first guide image overlap.

An image editing method according to a still more preferable aspect may include causing the camera to image the projection region when the size of the overlapping region is equal to or larger than the threshold. According to this aspect, when the size of the overlapping region is equal to or larger than the threshold, it is possible to cause the camera to automatically image the projection region. Labor of the user is reduced.

In an image editing method according to a still more preferable aspect, the acquiring the captured image may be acquiring the captured image by imaging the projection region where the first guide image is not displayed. According to this aspect, it is possible to edit the projection image based on the captured image of the projection region where the first guide image is not displayed.

An image editing system according to an aspect of the present disclosure includes: a camera; and a processing apparatus configured to control the camera. The processing apparatus executes acquisition processing and output processing. In the acquisition processing, the processing apparatus acquires a captured image captured by a camera in a projection region including a projection target object, which is a projection destination of an image from a projector, a first guide image being displayed in the projection region by the projector. The projection region is a region in a real space where the projector and the projection target object are disposed. A position of the camera that captures the captured image is a position in the real space where a center portion of an imaging range of the camera and a center portion of the first guide image overlap. In the output processing, the processing apparatus transmits, to the projector, projection image data representing a projection image obtained by editing the captured image acquired in the acquisition processing. With the image editing system in this aspect, even a user not having expertise is capable of easily performing projection mapping.

A non-transitory computer-readable storage medium storing a program according to an aspect of the present disclosure causes a computer to execute acquisition processing and output processing. In the acquisition processing, the computer operating according to this program acquires a captured image captured by a camera in a projection region including a projection target object, which is a projection destination of an image from a projector, a first guide image being displayed in the projection region by the projector. The projection region is a region in a real space where the projector and the projection target object are disposed. A position of the camera that captures the captured image is a position in the real space where a center portion of an imaging range of the camera and a center portion of the first guide image overlap. In the output processing, the computer operating according to the program transmits, to the projector, projection image data representing a projection image obtained by editing the captured image acquired in the acquisition processing. With the storage medium storing the program in this aspect, even a user not having expertise is capable of easily performing projection mapping.

What is claimed is:

1. An image editing method comprising:
  acquiring a captured image of a first image projected from a projector by imaging, with a camera, from a position in a real space where a center portion of an imaging range of the camera and a center portion of the first image overlap, a projection region in the real space including a projection target object, which is a projection destination of an image from the projector, the first image being displayed in the projection region by the projector;

transmitting a second image obtained by editing the captured image to the projector; and displaying, on a display apparatus, a superimposed image obtained by superimposing an image obtained by imaging, with the camera, the projection region where the first image is projected and a third image indicating the center portion of the imaging range, wherein the position is a position where a center portion of the third image and the center portion of the first image in the superimposed image overlap.

2. The image editing method according to claim 1, further comprising, when the captured image is acquired, displaying a user interface image used to invoke an editing function for editing the captured image, wherein the second image is obtained by editing the captured image with the editing function.

3. The image editing method according to claim 1, further comprising outputting a notification for requesting a user to move the camera to the position.

4. The image editing method according to claim 3, further comprising determining whether or not a size of a region where the center portion of the first image and the center portion of the imaging range overlap in the superimposed image is smaller than a threshold, wherein the outputting the notification is outputting the notification when the size of the region is smaller than the threshold.

5. The image editing method according to claim 4, further comprising causing the camera to image the projection region when the size of the region is equal to or larger than the threshold.

6. The image editing method according to claim 1, wherein the acquiring the captured image is acquiring the captured image by causing the camera to image the projection region where the first image is not displayed.

7. An image editing system comprising:
a camera; and
a processing apparatus configured to control the camera, the processing apparatus executing:
acquiring a captured image of a first image projected from a projector by imaging, with a camera, from a position in a real space where a center portion of an imaging range of the camera and a center portion of the first image overlap, a projection region in the real space including a projection target object, which is a projection destination of an image from the projector, the first image being displayed in the projection region by the projector; and transmitting a second image obtained by editing the captured image to the projector; and displaying, on a display apparatus, a superimposed image obtained by superimposing an image obtained by imaging, with the camera, the projection region where the first image is projected and a third image indicating the center portion of the imaging range, wherein the position is a position where a center portion of the third image and the center portion of the first image in the superimposed image overlap.

8. A non-transitory computer-readable storage medium storing a program for causing a computer to execute:
acquiring a captured image of a first image projected from a projector by imaging, with a camera, from a position in a real space where a center portion of an imaging range of the camera and a center portion of the first image overlap, a projection region in the real space including a projection target object, which is a projection destination of an image from the projector, the first image being displayed in the projection region by the projector; and transmitting a second image obtained by editing the captured image to the projector; and displaying, on a display apparatus, a superimposed image obtained by superimposing an image obtained by imaging, with the camera, the projection region where the first image is projected and a third image indicating the center portion of the imaging range, wherein the position is a position where a center portion of the third image and the center portion of the first image in the superimposed image overlap.

* * * * *